United States Patent
Keulders et al.

(10) Patent No.: US 10,442,232 B2
(45) Date of Patent: Oct. 15, 2019

(54) INKJET PRINTABLE MULTI-LAYER SHRINK FILM

(71) Applicant: Sihl GmbH, Düren (DE)

(72) Inventors: Roy Keulders, Heerlen (NL); Manfred Schäfer, Köln (DE); Axel Niemöller, Düren Niederau (DE)

(73) Assignee: SIHL GMBH, Duren (DE)

( * ) Notice: Subject to any disclaimer, the term of this patent is extended or adjusted under 35 U.S.C. 154(b) by 270 days.

(21) Appl. No.: 15/183,671

(22) Filed: Jun. 15, 2016

(65) Prior Publication Data

US 2016/0361939 A1 Dec. 15, 2016

(30) Foreign Application Priority Data

Jun. 15, 2015 (DE) .................. 10 2015 007 438

(51) Int. Cl.
*B41M 5/50* (2006.01)
*B41M 5/52* (2006.01)
(Continued)

(52) U.S. Cl.
CPC ............ *B41M 5/5272* (2013.01); *B32B 1/08* (2013.01); *B32B 7/04* (2013.01); *B32B 7/12* (2013.01); *B32B 23/08* (2013.01); *B32B 23/16* (2013.01); *B32B 23/18* (2013.01); *B32B 23/20* (2013.01); *B32B 27/08* (2013.01); *B32B 27/20* (2013.01); *B32B 27/26* (2013.01); *B32B 27/302* (2013.01); *B32B 27/304* (2013.01); *B32B 27/32* (2013.01); *B32B 27/36* (2013.01); *B32B 37/00* (2013.01); *B41J 3/4073* (2013.01); *B41M 5/508* (2013.01); *B41M 5/5236* (2013.01); *B41M 5/5254* (2013.01); *G09F 3/06* (2013.01); *B32B 23/22* (2013.01); *B32B 2250/24* (2013.01); *B32B 2255/10* (2013.01); *B32B 2255/26* (2013.01);
(Continued)

(58) Field of Classification Search
CPC .. B41M 5/508; B41M 5/5236; B41M 5/5254; B41M 5/5272; B32B 27/08; B32B 27/32; B32B 27/36
See application file for complete search history.

(56) References Cited

U.S. PATENT DOCUMENTS

2003/0087061 A1* 5/2003 Tashiro ................. B41C 1/1066
428/141
2009/0139891 A1 6/2009 Oshima et al.
(Continued)

FOREIGN PATENT DOCUMENTS

CA 818454 A 7/1969
DE 60007233 T2 9/2004
(Continued)

*Primary Examiner* — Betelhem Shewareged
(74) *Attorney, Agent, or Firm* — Knobbe, Martens, Olson & Bear, LLP

(57) ABSTRACT

The present invention relates to a multi-layer shrink film comprising at least one shrink base layer and an inkjet printable layer, the latter comprising at least one cellulose-based binding agent, to methods of making such a multi-layer shrink film and of providing graphical information by means of such a multi-layer shrink film, to articles provided with such a multi-layer shrink film as well as to the use of a particular cellulose-based binding agent in the inkjet printable layer of an inkjet printable shrink film.

31 Claims, 1 Drawing Sheet

(51) Int. Cl.

| | | |
|---|---|---|
| *B32B 7/12* | (2006.01) | |
| *B32B 23/08* | (2006.01) | |
| *B32B 23/20* | (2006.01) | |
| *B32B 23/16* | (2006.01) | |
| *B32B 23/18* | (2006.01) | |
| *B32B 27/36* | (2006.01) | |
| *B32B 1/08* | (2006.01) | |
| *B41J 3/407* | (2006.01) | |
| *G09F 3/06* | (2006.01) | |
| *B32B 7/04* | (2019.01) | |
| *B32B 27/08* | (2006.01) | |
| *B32B 27/20* | (2006.01) | |
| *B32B 27/26* | (2006.01) | |
| *B32B 27/30* | (2006.01) | |
| *B32B 27/32* | (2006.01) | |
| *B32B 37/00* | (2006.01) | |
| *B41J 2/01* | (2006.01) | |
| *B32B 23/22* | (2006.01) | |

(52) U.S. Cl.
CPC ....... *B32B 2270/00* (2013.01); *B32B 2307/31* (2013.01); *B32B 2307/4023* (2013.01); *B32B 2307/4026* (2013.01); *B32B 2307/516* (2013.01); *B32B 2307/518* (2013.01); *B32B 2307/7242* (2013.01); *B32B 2307/7265* (2013.01); *B32B 2307/732* (2013.01); *B32B 2307/736* (2013.01); *B32B 2307/75* (2013.01); *B32B 2439/00* (2013.01); *B32B 2519/00* (2013.01); *B41J 2/01* (2013.01)

(56) References Cited

U.S. PATENT DOCUMENTS

| | | | |
|---|---|---|---|
| 2011/0012954 A1 | 1/2011 | Brown et al. | |
| 2013/0205629 A1* | 8/2013 | Hird | B32B 7/12 |
| | | | 40/638 |

FOREIGN PATENT DOCUMENTS

| | | |
|---|---|---|
| DE | 60108310 T2 | 3/2006 |
| EP | 0899121 A1 | 3/1999 |
| JP | 2005096391 A | 4/2005 |
| JP | 2008-238718 A | 10/2008 |
| JP | 2012-161918 A | 8/2012 |
| KR | 100435576 B1 | 6/2004 |
| WO | 0105600 A1 | 1/2001 |

* cited by examiner

INKJET PRINTABLE MULTI-LAYER SHRINK FILM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to a multi-layer shrink film comprising at least one shrink base layer and an inkjet printable layer, the latter comprising at least one cellulose-based binding agent, to methods of making such a multi-layer shrink film and of providing graphical information by means of such a multi-layer shrink film, to articles provided with such a multi-layer shrink film as well as to the use of a particular cellulose-based binding agent in the inkjet printable layer of an inkjet printable shrink film.

Inkjet printing is a widely used process for applying graphical information, including text and (optionally multi-color) images, to a substrate. In such a process, solvent-containing ink droplets are deposited from a nozzle onto an absorbent substrate, e.g. paper, to form the image. Rapid absorption of the ink into the substrate is a requirement for good image quality and to obtain images with a high color gamut and without printing defects. Most substrates need a special inkjet ink absorbing coating for good printing results. The inkjet coating formulations have to be adjusted to the specific substrate, papers for instance need different coatings than films. Moreover, there are numerous articles which cannot be imaged in good quality by direct inkjet printing, including, for instance, articles made of glass, metals, plastics and the like.

In addition, in general it is difficult to provide articles having uneven and/or curved surfaces with graphical information in any direct printing process.

Description of the Related Art

For this reason, printable shrink films have been developed which offer great freedom in packaging design regarding color and shape. These films comprise a mono- or biaxially oriented (stretched) polymer plastic film which reverts from its oriented to its relaxed state when heat is applied, thus shrinking and conforming tightly to the surface of the articles it is covering. Shrink films are nowadays widely used for decorating, labelling, packaging and/or wrapping all different kinds of articles, for instance including, but not being limited to, bottles, cans, containers, cartons, boxes, pallet loads, foods, cosmetics, cleaning agents, books, CDs, DVDs etc. In order to be inkjet printable, shrink films usually have to be provided with at least one ink receptive layer in addition to the conventional shrink layer, as described, for instance, in EP 0 899 121 A1, WO 01/05600 A1 or US 2013/0205629 A1. However, in such multi-layer shrink films the individual layers have to be carefully adapted to each other, in order to avoid brittleness, cracking, wrinkling or even delamination of the layers upon shrinking, but at the same time achieving a sufficient effectiveness of print drying.

SUMMARY OF THE INVENTION

Further, it should be possible to independently provide all individual layers as well as the whole multi-layer film either in a substantially colorless and transparent form, or in a semitransparent form or in an opaque form or in an optionally white or colored form in order to offer a maximum freedom of design when using such films for decorating and/or labelling articles. Herein the terms "transparent" refer to a light transmittance of at least 60%, determined according to DIN 53417 or ISO 22891, "semitransparent" to a light transmittance of between 10% and 60% and "opaque" to a light transmittance of from 0% to 10%, respectively.

Thus, a need exists for inkjet printable shrink films which avoid the above drawbacks and in particular for ink receiving layers which can be used in combination with different shrink base layers.

It has now surprisingly been found that this can be achieved if the inkjet printable layer comprises at least 5 wt.-%, based on its weight, of at least one cellulose-based binding agent selected from the group consisting of esters of cellulose with organic acids, cellulose ethers and mixtures thereof. Such inkjet printable layers can be combined with a variety of different conventional shrink base layers to provide inkjet printable multi-layer shrink films of excellent shrinking behavior, in particular with respect to an even and uniform shrinking of the joint layers, printability, durability and appearance, wherein high gloss, brilliance and transparency can be achieved, if desired. For instance, a substantially colorless and transparent multi-layer shrinking film according to the present invention preferably may have a haze of 10% or less, preferably 3% or less and most preferably less than 2%, determined according to ASTM-D-1003. Such films are suitable for e.g. clear film applications. In opaque or semitransparent, optionally white or colored multi-layer shrink films one or more layers may contain white or colored pigments, dyes or fillers as well as voids which are able to scatter visible light.

Moreover, incorporation of the above inkjet printable layers into a multi-layer shrink film is possible by various different methods, including co-extrusion of the different layers, applying a coating composition, which comprises the above cellulose-based binding agent and from which the inkjet printable layer is formed after drying, onto a preformed shrink base layer, and attaching the preformed inkjet printable layer to a preformed shrink base layer, preferably by means of an adhesive, so that methods for making the multi-layer shrink film of the present invention can be chosen and adopted easily to particular needs, e.g. a particular shrink base layer to be used and/or a particular temperature range required in making the film, e.g. for avoiding its early shrinking.

This is even more surprising as other cellulose-based binding agents have been described to require a certain degree of cross-linking in order to avoid cracking of a layer of pigment ink applied on an inkjet printable layer containing such cellulose-based binding agents. For instance, JP 2005-096391 A relates to ink-receiving layers comprising the inorganic cellulose ester nitrocellulose and describes that cross-linking of said cellulosic resin is necessary to avoid cracking. However, the cross-linking procedures described therein require high temperatures and/or long curing times even in the presence of a catalyst, which, when carried out in the presence of a heat shrinkable film, may lead to premature shrinkage of said film. In addition, cross-linking also has an impact on the shrinking properties of a layer and too high a degree of cross-linking is likely to impede shrinking.

Thus, the present invention relates to a multi-layer shrink film which comprises at least one shrink base layer and an inkjet printable layer, wherein the inkjet printable layer comprises at least 5 wt.-%, based on the weight of the inkjet printable layer, of at least one cellulose-based binding agent selected from the group consisting of esters of cellulose with organic acids, cellulose ethers and mixtures thereof.

Herein, the term "multi-layer shrink film" refers to a film which comprises at least two chemically different layers and exhibits a reduction in size (shrinkage) of at least 5%, preferably at least 10% in at least one of machine (MD) and transverse direction (TD) when subjected to an elevated temperature, e.g. to a temperature of 95° C. for a time period of 15 seconds in water according to ASTM 2732-14.

In the multi-layer shrink film of the present invention a layer may also be formed from a preformed film or foil to which the other layers of the multi-layer film have been attached, for instance from a suitable coating composition or as a preformed film or foil themselves, optionally using e.g. a laminating adhesive to form an adhesive intermediate interlayer. Lamination adhesives are known to the skilled person and may comprise e.g. pressure sensitive adhesives, heat seal adhesives, one component (1K) or two component (2K) cross-linking lamination adhesives, as well as UV or electron beam curable adhesives. These adhesives may be solvent born, water born or 100% solids, e.g. in the form of hot-melt adhesives, 1K or 2K polyurethane adhesives or 1K or 2K acrylate based adhesives. Examples are the commercially available LOCTITE LIOFOL LA 29-208/LA 5804 polyurethane based 2K lamination adhesive from Henkel (Düsseldorf, Germany) or LOCTITE LIOFOL LA 4503/LA 5804 acrylic based 2K lamination adhesive from Henkel (Düsseldorf, Germany) or ACRONAL V212 acrylic based contact adhesive supplied by BASF (Ludwigshafen, Germany).

The binding agent(s) in the inkjet printable layer ensure(s) the formation of a cohesive and optionally also self-supporting layer mechanically and/or chemically. Due to the presence of at least 5 wt.-% of at least one cellulose-based binding agent selected from the group consisting of esters of cellulose with organic acids, cellulose ethers and mixtures thereof, the inkjet printable layer of the multi-layer shrink film of the present invention can be readily printed by inkjet printing, applying latex, UV curing, waterborne as well as organic solvent borne inks. Inks comprising organic solvents may be preferred in the present invention. These kinds of inks include so-called "ecosolvent", "low solvent" or "mild solvent" inks and usually comprise medium to high boiling organic solvents as carrier medium for dyes, pigments, dispersants, stabilizers, binders and other ingredients. They are marketed e.g. by Roland Deutschland GmbH (Willich, Germany), Mutoh Deutschland GmbH (Düsseldorf, Germany), Epson (Meerbusch, Germany) and Mimaki Deutschland GmbH (Herrsching, Germany), such as Eco-Sol MAX Ink from Roland Deutschland GmbH. Typically printers with piezo inkjet print heads are suitable for these inkjet inks.

Solvent based ink jet inks being essentially free of water may be preferred in terms of the present invention. As used herein, the term "ink being essentially free of water" refers to an ink having no water intentionally added to the composition as a solvent and/or dispersant. Inks being essentially free of water may e.g. comprise less than 5 wt. % of water, e.g. less than 3 wt.-%, e.g. less than 1 wt.-%, based on the whole ink composition. Such inks are described, for example, in US 2011/0012954 A1, and comprise at least one organic solvent. Often, they comprise a mixture of organic solvents differing in polarity and evaporation rate as discussed below. They usually further comprise resins, colorants and surfactants dissolved or dispersed in the solvent or solvent mixture as well as further optional additives known to those skilled in the art, including, but not being limited to, dispersants, anti-foaming agents, wetting agents, viscosity modifiers, light stabilizers and the like.

In accordance with the method described in paragraph [0044] of US 2011/0012954 A1 the evaporation rate of a solvent can be determined by ASTM method D3359 and can be reported as a relative evaporation rate (RER), relative to n-butyl acetate. Based on this RER, the solvents can be grouped as a fast, intermediate and slow evaporating solvent according to their RERs. Solvents having a RER greater than 1.0 can be grouped as fast evaporating solvents; solvents having a RER from about 1.0 to about 0.01 can be grouped as intermediate evaporating solvents; and solvents having a RER less than about 0.01 can evaporating be grouped as slow solvents.

Fast evaporating solvents include, but are not limited to, methanol, ethanol, propanol, iso-propanol, acetone, methyl ethyl ketone, methyl isobutyl ketone, pentane, hexane, heptane, methyl acetate, ethyl acetate, propyl acetate, tert-butyl acetate, tert-butanol, tetrahydrofuran, as well as mixtures thereof. Medium evaporating solvents include, but are not limited to, butanol, pentanol, hexanol, heptanol, octanol, propylene glycol ethers (e.g. propylene glycol mono methyl ether, propylene glycol mono ethyl ether, propylene glycol n-propyl ether, propylene glycol n-butyl ether), dihydric alcohols (e.g. ethylene glycol, propylene glycol, butylene glycol), 1-methoxy-2-acetoxy propane, cyclohexanone, and mixtures thereof. Slow evaporating solvents include, but are not limited to glycol ethers having a total of at least about 10 carbon atoms per molecule, e.g. dipropylene glycol methyl ether, dipropylene glycol methyl ether acetate, dipropylene glycol n-butyl ether, tripropylene glycol monomethyl ether, tripropylene glycol-n-butyl ether, propylene glycol phenyl ether, and mixtures thereof.

The inkjet printable layer provided by the present invention is particularly suitable for being printed with essentially water-free solvent based ink jet inks, which comprise one or more of the above mentioned solvents from the same and/or different groups of evaporating behaviour according to their RER.

Special colors can be achieved by using metallic or white inks. White inks are particularly suitable to increase the opacity of colored areas when printed in the back of these colors, i.e. underlying them. This printing technique allows high quality printing onto colored or metallic articles and/or the provision of a metallic or white background, e.g. on transparent materials.

Cellulose ethers are cellulose derivatives, in which the hydroxyl groups of the cellulose have been partially or fully reacted with a reagent to obtain an ether bond. Cellulose ethers in terms of the present invention include alkyl ethers, such as, for instance, methyl cellulose, ethyl cellulose or ethyl methyl cellulose, hydroxyalkyl cellulose ethers, such as, for instance hydroxyethyl cellulose and hydroxypropyl cellulose, carboxyalkyl cellulose ethers, such as, for instance, carboxymethyl cellulose (CMC), as well as mixtures and mixed derivatives thereof, such as, for instance, hydroxyethyl methyl cellulose, hydroxypropyl methyl cellulose and ethylhydroxy ethyl cellulose.

In esters of cellulose with organic acids the hydroxyl groups of cellulose have been partially or fully reacted with at least one organic acid.

Preferably, the at least one cellulose-binding agent may comprise an ester of cellulose with organic acids, which more preferably may be selected from the group consisting of mixed cellulose esters, i.e. esters comprising a combination of different acyl groups. Even more preferably, said mixed cellulose esters may comprise a combination of different acyl groups selected from the group consisting of acetyl, butyryl, proprionyl and trimellityl groups. Most preferably, the at least one cellulose binding agent may represent cellulose acetate propionate or cellulose acetate butyrate or a mixture thereof.

Such preferred cellulose ethers and cellulose esters are commercially available, for instance from Eastman Chemical Company, Kingsport, Tenn., US.

Preferred cellulose acetate butyrate (CAB) or cellulose acetate propionate (CAP) binding agents may have a number average molecular weight Mn being in the range of from 10.000 to 90.000 g/mol, determined as polystyrene equivalent number average molecular weight by gel permeation chromatography, a butyryl or propionyl content being in the range of from 30 to 70 wt.-% and/or a glass transition temperature Tg being in the range of from 80 to 170° C. Preferred cellulose esters may comprise from 30 wt.-% to 50 wt.-% butyryl and/or propionyl groups, from 0.05 wt.-% to 20 wt.-% acetyl groups and from 0.5 to 10 wt.-% hydroxyl groups. Such preferred cellulose esters are commercially available, e.g. from Eastman Chemical.

The at least one shrink base layer of the multi-layer shrink film of the present invention comprises one or more thermoplastic polymers. The layer comprising the thermoplastic polymers may be oriented mono- or bidirectionally, i.e. made to shrink in either of machine or transverse directions or both. To achieve this, a drawforce is applied to the respective layer in a heated state, i.e. it is stretched, to orient the polymer molecules from their initial random pattern, in which they are twisted and coiled and have no particular orientation or alignment. Proper cooling the layer freezes the molecules in their oriented state wherein the amorphous regions of the polymer chains are straightened and aligned to the direction of orientation until the layer is reheated and shrinks back toward its initial dimensions.

On a commercial scale film orientation is usually achieved using a tenter frame, a machine direction orienter (MDO) via rolls with increasing speed or a double bubble process, which are well known to a person skilled in the art.

The thermoplastic polymers in the shrink base layer of the multi-layer shrink film of the present invention may preferably be selected from the group consisting of (co)polyvinyl chloride, (co)polystyrene, (co)polyolefins, (co)polyesters as well as mixtures, blends and copolymers thereof, more preferably from the group consisting of polyvinyl chloride (PVC), glycol-modified polyethylene terephthalate (PETG), polystyrene (PS), styrene-butadiene copolymer, polypropylene (PP), polyethylene (PE), polylactic acid (PLA) and cyclic olefin copolymer/polyethylene (COC/PE) as well as mixtures, blends and copolymers thereof. Both said (co)polymers as well as the films made thereof, which optionally may already be mono- or biaxially oriented and can be used as received in the shrink base layer of the multi-layer shrink film of the present invention, are commercially available. For ecological reasons it may, however, be preferred that the shrink base layer does not comprise PVC.

Preferably the shrink layer itself may show a dimensional change of at least 5%, more preferably of at least 10% in at least one of transverse direction (TD) or machine direction (MD), both determined according to ASTM 2732-14 at 95° C. for 15 sec in water. Herein, the term "shrink layer itself" refers to a film or foil of the shrink layer without any additional attached layers, having, however, the same thickness etc. as in the multi-layer film. More preferably, the dimensional change of the shrink layer may be high, i.e. at least 20%, even more preferably at least 30%, still even more preferably at least 40% and most preferably may range from 45% to 99% of shrinkage in one of TD or MD and low, i.e. at most 10%, even more preferably at most 7.5%, still even more preferably at most 6% and most preferably may range from 0% to 5% of dimensional change (shrinkage or dilation) in the other direction, determined according to ASTM 2732-14 at 95° C. for 15 sec in water. It may be preferred that the shrink layer shows high shrinkage as specified above in TD, while shrinkage or dilation in MD is low, or that shrinkage is high in MD, while shrinkage or dilation in TD is low. Herein, the term dilation refers to a negative shrinkage.

Preferably the shrink layer itself may a haze of 3.0% or lower, determined according to ASTM-D-1003.

It has surprisingly been found that when applying a coating forming the inkjet printable layer described herein to a preformed shrink base layer in form of a shrink film, the shrink properties of the resulting multi-layer shrink film according to the present invention remain substantially unchanged compared to the non-coated film forming the shrink base layer with respect to the direction of higher shrinkage, i.e. one of MD or TD, as the case may be. Hence, it is possible to provide multi-layer shrink films of various shrink properties depending on the shrink base layer selected. Preferably, shrinkage of the multi-layer shrink film in the direction of higher shrinkage is reduced by 30% at most, relative to the shrinkage of the sole shrink base layer without any coating in said direction, more preferably by 20% at most and even more preferably by 10% at most.

It may be preferred that shrink base layer comprises or even consists of PETG. Further, it may be preferred to use a preformed PETG shrink film or foil as shrink base layer which preferably shows a dimensional change of at least 40% in TD and of at most 6% in MD, both determined according to ASTM 2732-14 at 95° C. for 15 sec in water. Suitable preformed shrink films and foils are commericially available, for instance from Klöckner Pentaplast GmbH (Burgkirchen, Germany) under the trade mark Pentalabel® Rigid PETG films.

In addition to the above-discussed cellulose-based binding agent(s) the inkjet printable layer of the multi-layer film of the present invention further may comprise at least one tackifying resin and/or at least one plasticizer. Herein, the tackifying resin preferably may comprise a rosin-based tackifying resin. Further the inkjet printable layer may optionally comprise one or more further binding agent(s) in addition to the cellulose-based binding agent selected from the group consisting of esters of cellulose with organic acids, cellulose ethers and mixtures thereof.

According to the well-acknowledged definition known to those skilled in the art, a rosin, also called colophony or Greek pitch, is a resin obtained from pines and other plants, such as conifers, produced by heating fresh liquid resin to vaporize the volatile liquid terpene components. Rosin mainly consists of different resin acids, in particular abietic acid. If present, the rosin-based tackifying resin in the inkjet printable layer preferably may comprise at least one fully or partially hydrogenated rosin or an ester thereof. Preferably, the rosin-based tackifying resin may comprise at least one ester of a fully or partially hydrogenated rosin, more preferably at least one ester of a fully or partially hydrogenated rosin selected from the group consisting of ethyl, ethylene glycol, diethylene glycol, glyceryl, methyl, pentaerithrityl and triethylene glycol esters and mixtures thereof.

Preferably, the rosin-based tackifying resin(s) may have a softening point, which is in the range of from −50 to 150°

C., determined according to the ring and ball method of ASTM E28, more preferably of from −10° C. to 90° C. In addition, it may be particularly preferred that the above-mentioned rosin-based tackifying resins have a Gardner color of equal to or less than 7, more preferably of equal to or less than 5 and even more preferably of equal to or less than 3.

The Gardner color scale, as specified in ASTM D1544-04, is a single number color scale for grading light transmitting samples with color characteristics from light yellow to brownish-red, wherein the scale is defined by the chromaticity of glass standards numbered from 1 for the lightest and 18 for the darkest. Liquid resins are measured as is/neat. Solid resins are measured as resin solutions, e.g. 50% in toluene or xylene.

Suitable rosin-based tackifying resin are commercially available, for instance from Eastman Chemical Company under the trade names Foral™, Foralyn™, Pentalyn™, Permalyn™ and Stabelite™, from Arizona Chemical (Jacksonville, Fla., USA), Arakawa Chemical USA Inc. (Chicago, Ill., USA), from Foreverest (Xiamen City, China) or from Teckrez Inc. (Fleming Island, Fla., USA).

In terms of the present invention, a tackifying resin is a chemical compound or mixture of compounds which serve(s) to increase the hot tack, i.e. the stickiness at elevated temperatures (≥50° C.), of the surface of a layer containing it. However, said tackifying resin preferably does not necessarily impart an enhanced stickiness at room temperature (23° C.) to a layer containing it. If used in the inkjet printable layer, in particular in combination with a plasticizer, it is possible to provide an inkjet printable layer in form of a preformed heat sealable film or foil, which may be attached to a shrink base layer without additional intermediate adhesive layers. In this case, the whole multi-layer shrink film of the present invention may be heat-sealable.

If the inkjet printable layer itself can serve as an adhesive under certain conditions, like it is the case, for instance, for the above described heat-sealable inkjet printable layers at elevated temperatures where these layers become tacky, an additional adhesive for fixing the edges of the shrink sleeve label prior to shrinking may be omitted. Herein heat seal properties can be adjusted by adjusting the type and amount of ingredients of said layer, e.g. tackifying resins and plasticizers.

Herein the term "heat sealable" (sometimes also referred to as "hot sealable") refers to a material that due to its thermoplastic nature, i.e. being moldable above a specific temperature, returning to solid state upon cooling, can be joined with a similar or dissimilar material using heat, i.e. a temperature above room temperature (23° C.), and optionally also pressure.

The plasticizer is chemically different from the cellulose-binding agent and the tackifying resin and serves to increase the plasticity and flexibility of the inkjet printable layer.

In addition to the above discussed cellulose-based binding agent(s) selected from the group consisting of esters of cellulose with organic acids, cellulose ethers and mixtures thereof, the inkjet printable layer in the multi-layer shrink film of the present invention may comprise further cellulose-based binding agent(s), including, but not being limited to, esters of cellulose with inorganic acids, such as nitrocellulose or cellulose sulphate, as well as non-cellulose-based binding agents and combinations thereof. If present, such non-cellulose-based binding agents preferably may be selected from the group comprising acrylic (co)polymers, polyurethanes, polyvinyl alcohols, polyvinyl acetates, polyvinyl butyrals as well as blends, mixtures and copolymers thereof. Specific polymers include, but are not limited to, acrylic copolymers or homopolymers containing materials, such as, methyl methacrylate, ethyl methacrylate, butyl methacrylate, ethylene methacrylic acid, ethylene acrylic acid, acrylic acid, ethyl acrylate, methyl acrylate, butyl acrylate, iso-octyl acrylate, 2-ethylhexyl acrylate; polyurethane polymers and copolymers; vinyl copolymers such as vinyl chloride/vinyl acetate copolymers and urethane/acrylate copolymers.

Cellulose-based binding agent(s) preferably may represent(s) the main component of all binding agents being present in the inkjet printable layer, i.e. its (or their combined) amount in wt.-% exceeds the amount of any other binding agent being present in said layer. More preferably the cellulose-based binding agent(s) may represent the main component in the inkjet printable layer, i.e. its (or their combined) amount in wt.-% exceeds the amount of any other compound being present in said layer.

The inkjet printable layer preferably may comprise 40 to 90 wt.-%, based on the total weight of said layer, of one or more binding agents. Preferably, the inkjet printable layer may comprise 50 to 80 wt.-%, even more preferably 50 to 70 wt.-%, based on the total weight of said layer, of one or more binding agents.

The percentage of cellulose-based binding agent(s) from the total amount of binding agent(s) in the inkjet printable layer preferably may be at least 50 wt.-%, preferably at least 75 wt.-%, more preferably at least 80 wt.-% and even more preferably at least 90 wt.-%, based on the total weight of binding agent(s) in the inkjet printable layer. The binding agent(s) of the inkjet printable layer may also exclusively consist of cellulose-based binding agent(s), i.e. its/their percentage from the total amount of binding agent(s) in the inkjet printable layer may also be 100 wt.-%. Herein it may be preferred that at least 50 wt.-%, more preferably at least 75 wt.-%, even more preferably at least 80 wt.-%, still even more preferably at least 90 wt.-% and most preferably 100 wt.-% of all cellulose-based binding agent(s) being present in the inkjet printable layer are selected from esters of cellulose with organic acids, cellulose ethers and mixtures thereof.

The inkjet printable layer preferably may comprise 5 to 50 wt.-%, based on the total weight of the inkjet printable layer, of one or more tackifying resins. Rosin-based tackifying resins are preferred, but also non-rosin tackifying resins may be used. If present, the percentage of rosin-based tackifying resin(s) from the total amount of tackifying resin(s) in the inkjet printable layer preferably may be at least 50 wt.-%, more preferably at least 75 wt.-%, even more preferably at least 80 wt.-% and still even more preferably at least 90 wt.-%, based on the total weight of tackifying resin(s) in the inkjet printable layer. The tackifying resin(s) in the inkjet printable layer may also exclusively consist of rosin-based tackifying resin(s), i.e. its/their percentage from the total amount of tackifying resin(s) in the inkjet printable layer may also be 100 wt.-%.

The inkjet printable layer preferably may comprise 5 to 50 wt.-%, based on the total weight of the inkjet printable layer, of one or more plasticizers. Print characteristics like drying time, ink coalescence and image density may be adjusted by varying the quantities of binding agent, plasticizer and tackifying resin as well as optional further additives in the formulation, depending on the particular substance(s) chosen in each class.

Optionally, the inkjet printable layer may also comprise organic and/or inorganic pigments and/or fillers. Said pigments or fillers preferably may be present in an amount ranging of from 0.1 to 10 wt.-%, based on the total weight of the inkjet printable layer. Particulate fillers may be preferred, in particular those having a medium particle size dv50 being in the range of from 0.1 to 50 µm. Particle size measurement is conducted with laser diffraction method according to ISO 13320 (2009 Dec. 1) with a Beckmann Coulter LS device (LS 13-320, Beckmann Coulter Corporation, Brea, Calif., USA).

Suitable particles and fillers include particulate silica, alumina or its hydroxides, polyolefins, polyacrylates, polymethacrylates, polyurethanes, polyamides, polyureas as well as mixtures thereof, without being limited to these. Further suitable particulate materials include chalk, calcium carbonate, magnesium carbonate, kaolin, calcined clay, pyrophylite, bentonite, zeolite, talc, synthetic aluminum and calcium silicates, diatomateous earth, anhydrous silicic acid powder, aluminum hydroxide, barite, barium sulfate, gypsum, calcium sulfate, copoly(methylmethacrylate/divinylbenzene), polystyrene, copoly(vinyltoluene/t-butylstyrene/methacrylic acid), and the like.

The use of pigments in the inkjet printable layer may be preferred in order to modify properties like slip, glossiness and tackiness of said layer, without being limited to these.

In addition to or instead of such pigments and/or fillers, the inkjet printable layer optionally may comprise one or more components which preferably may be selected from the group consisting of colorants and dyes, heat and/or ultraviolet light stabilizers, UV absorbers, free radical scavengers, surfactants, wetting agents, dispersing aids, antifoaming agents, deaerators, rheological additives, substrate wetting and anti-cratering additives, ink fixing agents, flow improvers, antioxidants, brighteners, phosphorescence agents, cross-linking agents, antistatic agents and mixtures thereof.

If, present, the at least one plasticizer in the inkjet printable layer preferably may be selected from the group consisting of optionally epoxidized oils, fatty acids as well as esters thereof, benzoates, glyceryl esters, esters of polycarboxylic acids with linear or branched aliphatic alcohols, (poly)glycol esters, sulfonamides, polymeric plasticizers and mixtures thereof. More preferably, the at least one plasticizer may be selected from the group consisting of epoxidized vegetable oils, oleates, caprates, tallates, glyceryl esters, (poly)glycol esters, alkyl azelates, alkyl citrates, alkyl glutarates, alkyl phthalates, alkyl trimellitates, alkyl adipates, alkyl sebacates, alkyl maleates, alkyl terephthalates, N-(n-butyl) benzene sulfonamide and mixtures thereof. Examples of such preferred plasticizers, are, for instance, triethyl citrate, triethyl-2-acetyl citrate, tributyl citrate, tributyl-2-acetyl citrate, phthalates, such as, for instance, bis(2-ethylhexyl) phthalate (DEHP), diisononyl phthalate (DINP), di-n-butyl phthalate (DnBP or DBP), butyl benzyl phthalate (BBzP), diisodecyl phthalate (DIDP), dioctyl phthalate (DOP or DnOP), diisooctyl phthalate (DIOP), diethyl phthalate (DEP), diisobutyl phthalate (DIBP), di-n-hexyl phthalate, trimellitates, such as, for instance, trimethyl trimellitate (TMTM), tri-(2-ethylhexyl) trimellitate (TEHTM), tri-(n-octyl, n-decyl) trimellitate (ATM), tri-(heptyl, nonyl) trimellitate (LTM), n-octyl trimellitate (OTM), adipates, sebacates and maleates, such as, for instance, bis(2-ethylhexyl)adipate (DEHA), dimethyl adipate (DMAD), monomethyl adipate (MMAD), dioctyl adipate (DOA), dibutyl sebacate (DBS), dibutyl maleate (DBM), diisobutyl maleate (DIEM), sulfonamides, such as, for instance, N-ethyl toluene sulfonamide (ETSA, ortho and para isomers), N-(2-hydroxypropyl) benzene sulfonamide (HP-BSA), N-(n-butyl) benzene sulfonamide (BBSA-NBBS), polymeric plasticizers, such as polyesters of aliphatic dicarboxylic acids, e.g. polyadipates, such as polyesters of adipic acid and butanediol, and combinations thereof, without being limited to these.

It may be preferred that the one or more cellulose-based binding agent(s) and more preferably all binding agent(s) present in the inkjet printable layer of the multi-layer shrink film of the present invention is/are essentially not cross-linked, i.e. the amount of cross-linker in the respective binding agent of the inkjet printable layer or the coating composition from which said layer is formed, respectively, may preferably be less than 1 wt.-%, more preferably less than 0.1 wt.-%, even more preferably less than 0.01 wt.-%, based on the amount of the binding agent without cross-linker, and most preferably the binding agent or the coating composition, respectively, is completely free of any cross-linker.

It may be preferred that the inkjet printable layer of the multi-layer shrink film of the present invention is essentially free of silicone oil, further siloxanes and/or silanes, including oligo- and polysiloxanes as well as oligo- and polysilanes, i.e. the amount of these substances in the inkjet printable layer or the coating composition from which said layer is formed preferably may be less than 20 wt.-%, more preferably less than 10 wt.-%, even more preferably less than 1 wt.-%, still even more preferably less than 0.1 wt.-%, based on the amount of the binding agent, and most preferably the inkjet printable layer or the coating composition from which said layer is formed, respectively, is completely free of any of these substances.

In addition to the at least one shrink base layer and the inkjet printable layer the multi-layer shrink film of the present invention optionally may comprise one or more further layer(s).

For instance, the multi-layer shrink film of the present invention may comprise one or more additional layer(s) positioned between the shrink base layer and the inkjet printable layer. Said the additional layer(s) may preferably be selected from the group comprising additional ink receiving layers, adhesive layers, barrier layers, primer layers, seal layers, layers to adapt the color of the multilayer shrink film, layers for enhancing the mechanical and/or thermal resistance of the multilayer shrink film and combinations thereof. In particular when preformed films or foils are used for providing both the inkjet printable layer and the shrink base layer, the presence of at least one intermediate adhesive layer, comprising e.g. a pressure-sensitive or a laminating adhesive, may be preferred.

The multi-layer shrink film of the present invention may also comprise a protective layer, film or foil over the outer side of the shrink base layer and/or the inkjet printable layer, preferably at least over the inkjet printable layer. Preferably said protective layer may be a removable (peelable) protective film or foil, which protects and stabilizes the respective layer during incorporation into the multi-layer film of the present invention, if incorporated as a preformed film or foil, as well as during transport, storage and/or handling of the multi-layer film of the present invention, but can be easily removed e.g. prior to printing the inkjet printable layer or attaching the multi-layer shrink film of the present invention to an article.

The multi-layer shrink film of the present invention further may comprise one or more coating layer(s) over the outer side of the shrink base layer and/or on one or both sides of the protective layers, if present, to stabilize the whole multi-layer shrink film and/or the respective layer and/or impart particular properties to them, e.g. a particular color, color saturation, metallic effect, slip enhancement and/or antistatic properties. In the multi-layer shrink film of the present invention the shrink base layer preferably may have a thickness in the range of from 5 to 200 µm, more preferably of from 10 to 150 µm, even more preferably of from 15 to 100 µm and most preferably of from 20 to 90 µm, determined according to ISO 534.

In the multi-layer shrink film of the present invention the inkjet printable layer preferably may have a thickness in the range of from 1 to 100 µm, more preferably of from 2.5 to 75 µm, even more preferably of from 5 to 60 µm and most preferably of from 10 to 55 µm, determined according to ISO 534.

The whole multilayer shrink film including any layers permanently attached to each other, but without the optional removable protective film, foil or layer preferably may have a total thickness in the range of from 30 µm to 300 µm, more preferably from 50 µm to 200 µm, determined according to ISO 534.

The multilayer shrink film of the present invention may be provided in form of a roll, from which individually cut labels may be produced, if desired. After graphical information has been printed onto the inkjet printable layer, the (printed) multilayer shrink film of the present invention preferably may be provided in form of a sleeve, more preferably in form of a shrink sleeve label. Techniques for establishing the sleeve by seaming two opposing edges of a shrink film are well known in the art and include for instance laser or thermal welding, solvent bonding, gluing using e.g. standard or UV hot melts or pressure sensitive adhesives, without being limited to these.

Preferably the multi-layer shrink film, including the at least one shrink base layer, the inkjet printable layer as well as any optional coating and intermediate additional layers, but without any protective layer, may show a dimensional change of at least 5%, more preferably of at least 10% in at least one of transverse direction (TD) or machine direction (MD), both determined according to ASTM 2732-14 at 95° C. for 15 sec in water. More preferably, the dimensional change may be at least 20%, even more preferably at least 30%, still even more preferably at least 40% and most preferably may range from 45% to 99% in one of TD or MD and at most 10%, even more preferably at most 7.5%, still even more preferably at most 6% and most preferably may range from 0% to 5% in the other direction, determined according to ASTM 2732-14 at 95° C. for 15 sec in water. It may be preferred that shrinkage in TD is high, while shrinkage or dilation is low in MD or vice versa.

The present invention further relates to a method of making the multilayer shrink film of the present invention which comprises a step of providing at least one shrink base layer as described above with at least one inkjet printable layer as described above.

The multilayer shrink film of the present invention may be made using various different procedures as various different methods can be used for providing the shrink base layer with the inkjet printable layer. For instance, it is possible to use a preformed shrink base layer and/or a preformed inkjet printable layer comprising the at least one cellulose-based binding agent, i.e. in form of a (preformed) film or foil, and to either attach the other layer in form of a preformed film or foil as well, optionally using intermediate adhesive layers, or to apply the other layer from a coating composition, in particular to apply a coating composition comprising the at least one cellulose-based binding agent over the preformed shrink base layer to form the inkjet printable layer. It is also possible to co-extrude the shrink base layer and the inkjet printable layer as well as any optional intermediate layers positioned between them, then stretching the whole multi-layer film under defined conditions in order to impart a controlled temperature dependent shrinking behaviour to it.

Techniques and means for applying coating compositions to films and foils are known in the art and include coating heads featuring a Mayer rod, an air knife, roll coating, reverse roll coating, gravure printing, reverse gravure printing, die coating, bead coating, slide coating or curtain coating, without being limited to these.

Attaching a preformed inkjet printable layer comprising the at least one cellulose-based binding agent to the preformed shrink base layer may be preferred. Herein, the preformed inkjet printable layer may be formed by applying a suitable coating composition to a temporary carrier paper, film or foil. Such coating compositions are described in detail in co-pending German patent application having the application number 10 2014 016 674.0.

Solvents and solvent mixtures used in such a coating composition will be able to dissolve the binding agent(s) as well as the optional tackifying resin(s) and plasticizer(s), if present, resulting in a clear solution. Solvents having good solving properties for the cellulose-based binding agent are preferred. These include alcohols, ethers, esters, ketones, and aromatic solvents, e.g. ethanol, propanol, butanol, isobutanol, methoxypropyl acetate, ethyl acetate, methyl acetate, acetone, methyl ethyl ketone, methyl isobutyl ketone, toluene, xylene and mixtures thereof, without being limited to these. Also strong solvents like dimethyl sulfone, dimethyl acetamide, diacetone alcohol etc. can be used. Particularly, solvents with a boiling point being in the range of about 60 to 250° C. are suitable for dissolving the ingredients of the coating composition, such as ethanol, isopropanol, n-propanol, butanol, diethyl ether, propylene glycol monomethyl ether, acetone, methyl ethyl ketone, methyl isobutyl ketone, ethyl acetate, butyl acetate, toluene and mixtures thereof, without being limited to these.

The temporary carrier paper, film or foil may protect and/or stabilize the inkjet printable layer until it is incorporated into the multi-layer shrink film of the present invention and/or printed, i.e. it may even serve as removable protective layer in the multi-layer shrink film. The temporary carrier paper, film or foil may optionally be coated with one or more release layers in order to reduce the adhesion of the inkjet printable layer to the temporary carrier paper, film or foil.

Suitable temporary carrier paper, films or foils and release layers are well known to those skilled in the art. Preferably, the temporary carrier paper, film or foil may comprise a substrate selected from the group consisting of paper, metal films and foils, plastic films and foils, nonwoven fabrics and composites and combinations thereof. The release layer can be coated onto the temporary carrier before applying the coating from which the inkjet printable layer is formed. The release layer, if present, may comprise an organic release agent, e.g. selected from the group consisting of polyamides, amide waxes, montan waxes, polyolefin waxes, ester waxes, calcium stearate, zinc stearate, carbamate release coatings, e.g. polyvinyl carbamates, such as polyvinyl octadecyl carbamate, polyvinyl esters, acrylate copolymers, fatty acid esters, polysaccharides, polysiloxanes, long chain alkyl- or fluoroalkyl compounds, e.g. polymers having one or more alkyl chains with a chain length of at least 12 carbons atoms, preferably of from 13 to 30 carbon atoms, most preferably poly(meth)acrylates with alkyl side chains having 16 to 20 carbon atoms, and mixtures of the aforementioned release agents. If present, said release layer(s) preferably may be (a) silicone-based release layer(s), in particular a polysiloxanecontaining layer. Furthermore, fluorine-containing substances or polymers, e.g. as coating or as temporary carrier film, are suitable for ensuring a proper release of the inkjet printable layer, e.g. films made of polytetrafluoroethylene, polyvinylidene fluoride or polyvinyl fluoride.

The release agent(s) in the release coating ensures that the temporary carrier can be removed from the inkjet printable layer very easily by hand. The release force between the temporary substrate material and inkjet printable layer is measured according to FTM 3 (Finat Test Methods) and usually should be between 0.05 N/50 mm and 8 N/50 mm force per sample width. Herein, the release force is determined by means of a tensile tester according to the Finat test method FTM 3 on 50 mm wide strips. For this purpose, the sample is separated manually to such an extent that the temporary substrate material and the inkjet printable layer, where applicable in combination with the shrink base layer and any optional intermediate layers, can be clamped in the holders of the tensile tester and then pulled apart at 300 mm/min, the force for this purpose being registered.

The present invention further relates to a method of providing graphical information by means of the multilayer shrink film of the present invention which comprises either the step of (i) printing said graphical information onto the inkjet printable layer or the step of (ii) attaching such a printed multilayer shrink film to an article by applying heat to said film causing it to shrink and conform to at least a part of the surface of said article or both steps (i) and (ii).

Herein step (i) of printing may be carried out before or after the inkjet printable layer is attached to the shrink base layer if the multilayer shrink film is made by attaching a preformed inkjet printable layer to the shrink base. If carried out before, the printed surface of the inkjet printable layer may be incorporated into the multi-layer shrink film of the present invention either facing a contact surface inside said multi-layer shrink film or facing an outer surface of said multi-layer shrink film.

Both methods of the present invention may further comprise one or more additional steps of modifying the outer surface of inkjet printable layer, in particular when a high gloss and highly smooth outer surface of the inkjet printable layer is exposed. Herein, the term "outer surface" refers to said surface of the inkjet printable layer which is opposite to a contact surface of the inkjet printable layer with a further layer in the multi-layer shrink film of the present invention to which the inkjet printable layer is or will be applied. Said surface will be facing an observer if the multi-layer shrink film of the present invention is applied to an article in such a way that the inkjet printable layer is exposed, i.e. that the shrink base layer is closer to the article than the inkjet printable layer. Such steps of modifying the outer surface preferably may include calendaring, embossing, engraving, grooving and/or stamping, which is well known to persons skilled in the art. Preferably, the surface structure of the already printed inkjet layer may be modified by contacting and pressing a structured surface, e.g. a surface-structured film or paper, at elevated temperatures, for instance at a temperature being in the range of from 50 to 150° C., e.g. in a heat press or in a lamination device, onto the layer. This procedure allows modifying the coating surface to a desired gloss level or surface structure, e.g. a grain, and may preferably carried out on a preformed inkjet printable layer before its application to the shrink base layer. Preferably, it should be performed at temperatures which do not lead to a premature shrinking (pre-shrinkage) of the film.

Various methods for attaching shrink films to articles and shrinking said films by applying heat are well known to persons skilled in the art and can be used in terms of the present invention. They include e.g. shrinking by hot air, steam, IR radiation and/or a heated water bath and the like, without being limited to these. The respective devices, including small-scale, hand-held devices as well as fully automated packaging machines including roll-fed lines, are commercially available.

Herein, either of the inkjet printable and the shrink base layer may be placed closer to the article, i.e. the multi-layer shrink film of the present invention may be attached to an article with optionally either of its surfaces facing an observer.

The optimum temperature and time range used for shrinking a particular multi-layer shrink film of the present invention will depend on various factors, such as the thermoplastic polymer(s) used, the thickness of the individual layers in the multi-layer shrink film as well as its total thickness, the shape of the article to which the multi-layer shrink film is applied etc., but can be easily determined in routine experiments, as will be appreciated by those skilled in the art. In general the multi-layer shrink film of the present invention will be exposed to a temperature or temperature profile, e.g. a temperature ramp, being in the range of from 60 to 150° C., preferably of from 80 to 130° C., for a time period being in the range of from 1 second (s) to 30 minutes (min), preferably of from 5 s to 15 min, more preferably of from 10 s to 1 min, to achieve shrinking.

Under these conditions, the multi-layer shrink film, including any of the at least one shrink base layer, the inkjet printable layer as well as any optional coating and intermediate additional layers, but without any protective layer, preferably may show a shrinkage of at least 5%, more preferably of at least 10% in at least one of transverse direction (TD) or machine direction (MD). More preferably, the dimensional change may be at least 20%, even more preferably at least 30%, still even more preferably at least 40% and most preferably may range from 45% to 99% in one of TD or MD and at most 10%, even more preferably at most 7.5%, still even more preferably at most 6% and most preferably may range from 0% to 5% in the other direction. It may be preferred that shrinkage in TD is high, while shrinkage or dilation is low in MD or vice versa.

Using the method of the present invention, the multi-layer shrink film of the present invention can be applied to articles made of a variety of materials, including paper, cardboard, glass, metals, stone, ceramics, porcelain, plastics, rubber, wood, woven and non-woven fabrics, food, cosmetics and mixtures as well as composites thereof, without being limited to these.

The invention further relates to articles provided with the multilayer shrink film of the present invention, wherein said articles preferably may be indirectly printed articles which have been provided with graphical information by means of the multilayer shrink film using the method described above.

Said articles may comprise or represent paper, cardboard, glass, metals, stone, ceramics, porcelain, plastics, rubber, wood, woven and non-woven fabrics, food, cosmetics and mixtures as well as composites thereof, without being limited to these.

Further, the present invention also relates to use of a cellulose-based binding agent selected from the group consisting of esters of cellulose with organic acids, preferably as described in detail above, in the inkjet printable layer of an inkjet printable shrink film.

The multi-layer shrink film of the present invention can be used in many different ways and on a wide variety of target articles. As examples (but not limited to these) it can be used as/on/for

- proofing applications, e.g. packaging proof or contract proof,
- mock-ups,
- envelopes, e.g. for books,
- banderoles,
- cans, drums, barrels,
- batteries,
- containers,
- wine capsules,
- glass and ceramic articles, e.g. bottles and glass-ware,
- advertising, indoors as well as outdoors,
- toys,
- wood,
- overwrap on packaging and pallet loads,
- food,
- cosmetics,
- sealing of electrical wiring,
- tamper-evident labels and packaging,
- wrapping and containment of construction elements, equipment and components.

DETAILED DESCRIPTION OF THE PREFERRED EMBODIMENT

Figure 1:
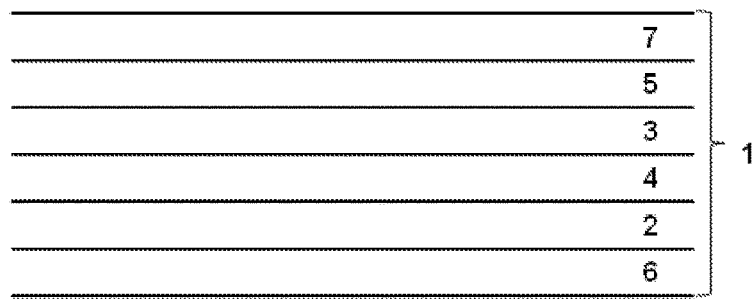
FIG. 1 schematically illustrates an exemplary multi-layer shrink film 1 according to the present invention comprising a shrink base layer 2 and an inkjet printable layer 3. In the specific embodiment shown in the figure, an additional layer 4, e.g. an adhesive layer, is positioned between these to layers. Further, the inkjet printable layer 3 is covered with a removable protective layer 5 and said protective layer 5 and the backside of the shrink base layer 2 each are provided with a coating layer 6 and 7, respectively, for stabilizing the shrink film and/or the respective layer and/or imparting particular properties to them.

Test Methods
Heat Shrink Properties:

Shrinkage or dilation of shrink films used as base shrink layers as well as the multi-layer shrink films of the present invention are determined according to ASTM 2732-14 by measuring the difference of sample lengths in transverse or machine web direction before and after immersing the respective film for 15 sec into hot water having a temperature of 95° C., unless otherwise specified. Shrinkage or dilation is defined as the relative length difference $\Delta=(L2-L1)/L1 \times 100$, wherein both the length before immersion (L1) and after immersion (L2) in one of both web directions are calculated as mean value of two measurements. As specimens 200 mm×200 mm sheets of the films are used. A digital caliper meter (MIB-Messzeuge GmbH, Spangenberg, Germany) according to DIN 862 is used.

Haze:

The haze of transparent films is measured according to ASTM D 1003 (Haze-gard Plus C; Byk-Gardner, Geretsried, Germany).

Print Quality:

A Roland printer comprising Eco-Sol MAX inks is used for print quality tested. A diagnostic test chart with 200 color patches is printed and evaluated concerning coalescence (uneven area fill of colored patches), pigment cracking (cracking of a homogeneously printed patches while drying the ink) and/or bronzing (bronzing is a phenomenon where, when an image is viewed from an angle, part of the image seems to disappear or take on a undesired metallic tone in appearance. It occurs because of some of the ink laid on the film coating is not properly absorbed into the coating, but remains on top of it. Even though the effect is only visible at certain angles, the perceived appearance is quite unattractive.). Furthermore the optical density of a blue color patch (100 parts magenta+100 parts cyan) as well as a black color patch (100 parts magenta+40 parts cyan+100 parts yellow+100 parts black) is measured by a SpectroEye spectrophotometer/densitometer (X-Rite Europe GmbH, Regensdorf, Switzerland).

EXAMPLES

Example 1

50 g cellulose acetate butyrate (CAB-381-20, Eastman Chemical Company), 20 g of a glycerol ester of partially hydrogenated rosin and 23 g of acetyl triethyl citrate as well as 0.3 g Propyltex® 270S (polypropylene pigment with a mean particle size of 20 µm, Micro Powders Inc.) were dissolved in 300 g methyl ethyl ketone (MEK). The solution was cast onto a siliconized paper liner (Sappi Ultracast Adva Patent, Sappi Fine Paper Europe SA, Brussels, Belgium) by means of a bar coater (Erichsen Coatmaster 510, Erichsen GmbH & Co. KG, Hermer, Germany) with a gap of 200-250 µm. After drying at 105° C. in a laboratory oven a dry coating weight of 45 g/m² was achieved. Onto this dry film a dry laminating adhesive comprising an adhesive polymer emulsion and a di-isocyanate cross-linking component (13 g/m² of LOCTITE LIOFOL LA 29-208/LA 5804, polyurethane based 2K lamination adhesive, Henkel, Dusseldorf, Germany) was coated. Subsequently, the adhesive was dried in a laboratory oven at 70° C. The dry coating weight of the adhesive layer was 10 g/m². A commercially available 40 µm thick, in transverse direction oriented PETG shrink film (Pentalabel® Rigid PETG LF-TG10F22-T52 made by Klöckner Pentaplast GmbH, Burgkirchen, Germany) was laminated in a lamination press onto the sticky adhesive surface. After curing the multi-layer shrink film for 1 day at room temperature, the siliconized paper liner was removed.

Figure 2:
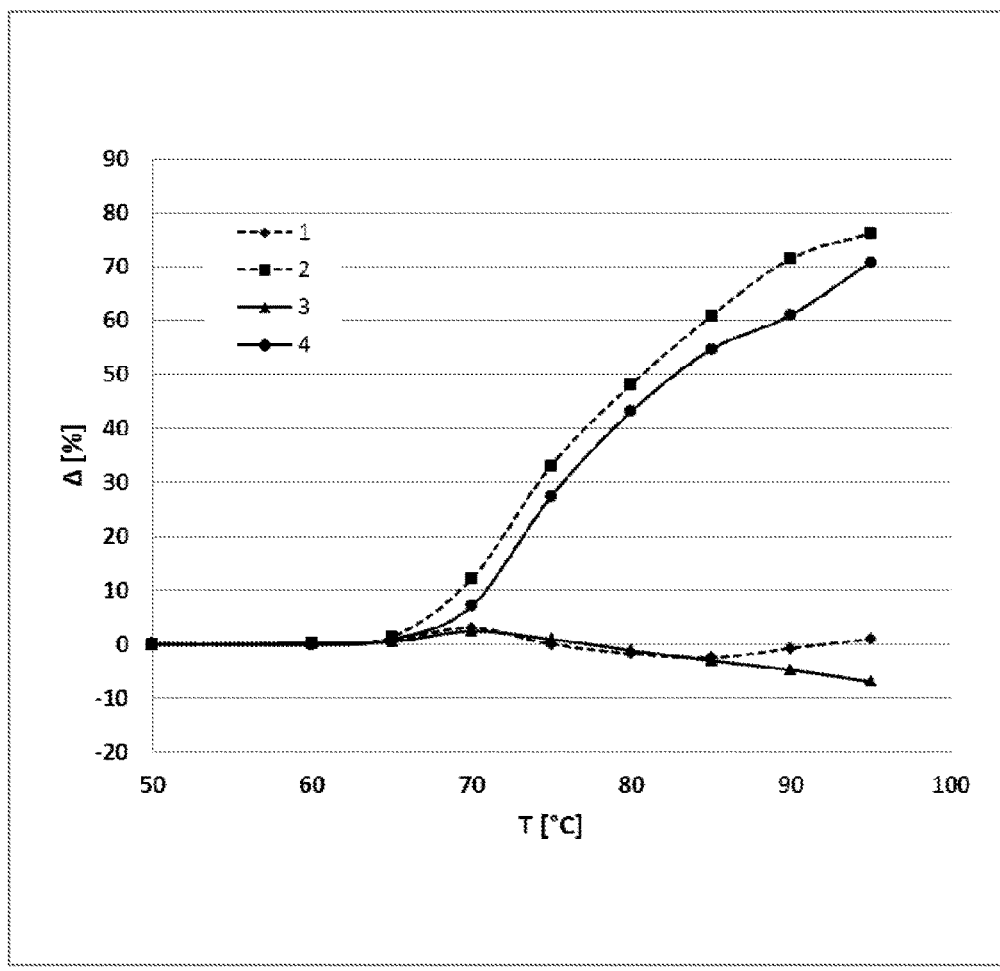
FIG. 2 illustrates the shrinking behavior (dimensional change $\Delta$) of a multi-layer shrink film according to the present invention, which is further described in Example 1 and comprises a shrink base layer attached to an inkjet printable layer by means of an intermediate adhesive layer, in comparison to the shrinking behavior of the shrink base layer alone according to ASTM 2732-14 in a water bath having defined temperatures (T) for 15 sec in TD and MD. The dotted lines show the shrinking behavior of the shrink base layer alone, i.e. without having an inkjet printable layer attached thereto, in MD (curve 1) and TD (curve 2). The solid lines show the shrinking behavior of a multi-layer shrink film according to the present invention comprising said shrink base layer in combination with an inkjet printable layer as described in Example 1 in MD (curve 3) and TD (curve 4).

The multi-layer shrink film was shrunk in a water bath having different temperatures of up to 95° C. for 15 sec in each case. At 95° C., the level of shrinkage was 70% in TD and −8% in MD (FIG. 2). The base film without any inkjet coating showed a shrinkage of 76% in TD and −1% in MD.

The inkjet printable layer was printed with an image using a Roland printer equipped with Eco-Sol MAX inks including white and metallic inks. The image quality obtained was excellent, particularly showing high brilliance, high color gamut and no coalescence. After drying the printed multi-layer shrink film comprising the shrink layer, the printed inkjet layer and the intermediate adhesive layer was cut to form a label. Said label was tightly wrapped around a PET bottle with the printed side facing the PET bottle and fixed by applying a strip of adhesive between the two opposing edges of the wrapped around label in order to hold the printed multi-layer shrink film in position. As the PET bottle has a 3-dimensional contoured shape, parts of the label still were not in close contact with the surface of the bottle. Next the prefixed film was heated by a hot air fan to a temperature of about 90° C. in order to achieve shrinking of the multi-layer shrink film tightly around the shaped PET bottle. After about 2 min of heating the multi-layer shrink film from all positions around the bottle, the film including the printed inkjet layer shrank uniformly around the bottle. The printed image was very colorful and vibrant without any printing artifacts like e.g. cracks, adhesion issues or color changes.

The coating compositions used for the inkjet printable layer in the examples are specified in Table 1. Herein, the following abbreviations and trade names are used:

MEK=methyl ethyl ketone
Dowanol™ PM=propylene glycol monomethyl ether (The Dow Chemical Company, Midland, Mich., USA)
CAB=cellulose acetate butyrate (Eastman Chemical Company, Kingsport, Tenn., USA)
ATBC=acetyl tributyl citrate
ATEC=acetyl triethyl citrate
Propyltex® 270S=dispersible polypropylene pigment (Micro Powders Inc., Tarrytown, N.Y., USA)
Elvacite® 2014=methyl methacrylate copolymer (Lucite International, Newton Aycliffe, UK)
Estane® 5750=polyurethane (Lubrizol Advanced Materials, Cleveland, Ohio, USA)

Example 2

Example 1 was reproduced except that the shrink film was facing the PET bottle instead of the printed inkjet layer. After about 2 min of heating the multi-layer shrink film from all positions around the bottle, the film including the printed inkjet layer shrank uniformly around the bottle. The printed image was very colorful and vibrant without any printing artifacts like e.g. cracks, adhesion issues or color changes.

Example 3

Example 1 was reproduced except that a water based pressure sensitive adhesive (Acronal® V212, BASF, Ludwigshafen, Germany) was used. After about 2 min of heating the multi-layer shrink film from all positions around the bottle, the film including the printed inkjet layer shrank uniformly around the bottle. The printed image was very colorful and vibrant without any printing artifacts like e.g. cracks, adhesion issues or color changes.

The multi-layer shrink film was also shrunk in a water bath having a temperature of 95° C. for 15 sec. The level of shrinkage was 72% in TD and −5% in MD.

Example 4

Example 1 was reproduced except that the shrink film used was a TD-oriented transparent 40 µm thick rigid PVC for Shrink Sleeve Label application (Pentalabel® Rigid PVC LF-T145/01-T02) and the shrink temperature was increased to approximately 110° C. After about 2 min of heating the multi-layer shrink film from all positions around the bottle, the film including the printed inkjet layer shrank uniformly around the bottle. The printed image was very colorful and vibrant without any printing artifacts like e.g. cracks, adhesion issues or color changes.

In addition, the multi-layer shrink film was shrunk in a water bath having a temperature of 95° C. for 15 sec. The level of shrinkage was 48% in TD and 3% in MD.

Example 5

Example 1 was reproduced except that the coating solution was cast directly onto a 40 µm thick transparent shrink film based on MD-oriented polypropylene (Label-Lyte 40LR210 ROSO, OPP film; Jindal Films, New Delhi, India) after corona treatment of the coating side. Drying in a lab oven was accomplished at 40° C. The obtained multi-layer shrink film was placed around the bottle in such a way that the shrink base layer was facing the bottle, so that the printed image was visible as a label. After about 2 min of heating the multi-layer shrink film from all positions around the bottle with hot air, the film including the printed inkjet layer shrank uniformly around the bottle. The printed image was very colorful and vibrant without any printing artifacts like e.g. cracks, adhesion issues or color changes.

In addition the multi-layer shrink film was shrunk in a water bath having a temperature of 95° C. for 15 sec. The level of shrinkage was 15% in MD and 1% in TD.

Example 6

Example 1 was reproduced except that the coating solution was cast directly onto a 50 µm thick transparent TD-oriented polyolefin shrink film (Label-Lyte 50TD200; Jindal Films, New Delhi, India) after corona treatment of the coating side. Drying in a lab oven was accomplished at 40° C. The obtained multi-layer shrink film was placed around the bottle in such a way that the shrink base layer was facing the bottle, so that the printed image was visible as a label. After about 2 min of heating the multi-layer shrink film from all positions around the bottle with hot air, the film including the printed inkjet layer shrank uniformly around the bottle. The printed image was very colorful and vibrant without any printing artifacts like e.g. cracks, adhesion issues or color changes.

In addition, the multi-layer shrink film was shrunk in a water bath having a temperature of 95° C. for 15 sec. The level of shrinkage was 50% in TD and 0% in MD.

Example 7

Example 1 was reproduced except that the coating solution was cast directly onto a 50 µm thick TD-oriented white shrink film Bonpet 7M based on PETG (BONSET America Corporation, Brown Summit, N.C., USA) after corona treatment of the coating side. Drying in a lab oven was accomplished at 40° C. The obtained multi-layer shrink film was placed around the bottle in such a way that the shrink base layer was facing the bottle, so that the printed image was visible as a label. After about 2 min of heating the multi-layer shrink film from all positions around the bottle, the film including the printed inkjet layer shrank uniformly around the bottle. The printed image was very colorful and vibrant without any printing artifacts like e.g. cracks, adhesion issues or color changes.

The multi-layer shrink film was in addition shrunk in a water bath having a temperature of 95° C. for 15 sec. The level of shrinkage was 78% in TD and −1% in MD.

Example 8

Example 1 was essentially reproduced except for the changes in composition shown in Table 1, in particular that a polyurethane (Estane® 5750, Lubrizol Deutschland GmbH, Ritterhude, Deutschland) was added to the coating composition for forming the inkjet printable layer comprising CAB, acetyl tributyl citrate as a plasticizer and partially hydrogenated rosin ester. Print quality as well as shrink properties are excellent.

The multi-layer shrink film was shrunk in a water bath having a temperature of 95° C. for 15 sec. The level of shrinkage was 70% in TD and −3% in MD.

Example 9

Example 1 was essentially reproduced except for the changes in composition shown in Table 1, in particular that a polyacrylate (Elvacite® 2014, Lucite International Specialty Polymers & Resins Ltd, Newton Aycliffe, United Kingdom) was added to the coating composition for forming the inkjet printable layer comprising CAB, acetyl tributyl citrate as a plasticizer and partially hydrogenated rosin ester. Print quality as well as shrink properties are excellent.

The multi-layer shrink film was shrunk in a water bath having a temperature of 95° C. for 15 sec. The level of shrinkage was 72% in TD and −3% in MD.

Example 10

Example 1 was essentially reproduced except for the changes in composition shown in Table 1, in particular that the formulation of Example 1 was varied concerning a higher content of CAB and a different rosin-based tackifying resin. Print quality as well as shrink properties are excellent.

The multi-layer shrink film was shrunk in a water bath having a temperature of 95° C. for 15 sec. The level of shrinkage was 74% in TD and 0% in MD.

Comparative Example 11

Example 5 was reproduced except that a typical aqueous PVA-based inkjet coating was applied to the shrink base layer and dried slowly at temperatures of 50° C. at most. The coating composition comprised 8 wt.-% Mowiol 26/88 (Kuraray Europe GmbH, Germany), 2 wt.-% polyvinylpyrrolidone K90 (ISP GmbH, Cologne, Germany) and 2 wt.-% diethylene glycol in water. This coating was printed using a Roland printer equipped with Eco-Sol MAX inks. The inks did not penetrate into the coating so that the image did not dry within 30 minutes. As the ink stayed on top of the coating, the image quality was very poor since ink coalescence and uncontrolled mixing of the colors took place.

A. LIST OF REFERENCE SIGNS 1 multi-layer, inkjet printable shrink film
2 shrink base layer
3 inkjet printable layer
4 optional additional layer
5 optional protective layer
6 optional coating layer
7 optional coating layer

What is claimed is:

1. A multi-layer shrink film comprising at least one shrink base layer and an inkjet printable layer, wherein the inkjet printable layer comprises at least 5 wt.-%, based on the weight of the inkjet printable layer, of at least one cellulose-based binding agent selected from the group consisting of esters of cellulose with organic acids, cellulose ethers and mixtures thereof,
wherein the inkjet printable layer comprises
40 to 90 wt.-%, of one or more binding agents, and/or
5 to 50 wt.-% of one or more tackifying resins, and/or
5 to 50 wt.-% of one or more plasticizers, and/or
0.1 to 10 wt.-% of organic or inorganic pigments and/or fillers, particulate fillers having a median particle size dv50 of from 0.1 to 50 μm, and/or
one or more components selected from the group comprising colorants and dyes, heat and/or ultraviolet light stabilizers, UV-absorbers, free radical scavengers, surfactants, dispersing aids, wetting agents, anti-foaming agents, deaerators, rheological additives, substrate wetting and anti-cratering additives, ink fixing agents, flow improvers, antioxidants, brighteners, phosphorescence agents, cross-linking agents, antistatic agents and mixtures thereof.

2. The multi-layer shrink film according to claim 1, wherein the at least one cellulose-based binding agent comprises an ester of cellulose with at least one organic acid.

3. The multi-layer shrink film according to claim 2, wherein the at least one cellulose-based binding agent is selected from the group consisting of mixed cellulose esters comprising a combination of different acyl groups selected from the group consisting of acetyl, butyryl, propionyl and trimellityl groups.

4. The multi-layer shrink film according to claim 2, wherein the at least one cellulose-based binding agent comprises cellulose acetate propionate and cellulose acetate butyrate and mixtures thereof.

5. The multi-layer shrink film according to claim 1, wherein the at least one shrink base layer comprises one or more thermoplastic polymers selected from the group consisting of (co)polyvinyl chloride, (co)polystyrene, (co)polyolefins, (co)polyesters as well as mixtures, blends and copolymers thereof, and, wherein said layer is oriented mono—or bidirectionally.

TABLE 1

| Example | MEK | Dowanol™ PM | CAB 381-20 | CAB 551-0.2 | ATBC | ATEC | Glycerol ester of partially hydrogenated rosin | Methyl ester of hydrogenated rosin | Propyltex ® 270S | Elvacite ® 2014 | Estane ® 5750 |
|---|---|---|---|---|---|---|---|---|---|---|---|
| 1-7 | 300.0 | | 50.0 | | | 23.0 | 20.0 | | 0.3 | | |
| 8 | 200.0 | | 43.7 | | 8.8 | | 5.0 | | | | 6.3 |
| 9 | 170.0 | 30.0 | 38.00 | | 12.0 | | 3.0 | | | 12.0 | |
| 10 | 200.0 | | 40.0 | 10.00 | 8.0 | | | 5.0 | | | |

6. The multi-layer shrink film according to claim 5, wherein the one or more thermoplastic polymers are selected from the group consisting of polyvinyl chloride (PVC), glycol-modified polyethylene terephthalate (PETG), polystyrene (PS), styrene-butadiene copolymer, polypropylene (PP), polyethylene (PE) and cyclic olefin copolymer/polyethylene (COC/PE) as well as mixtures, blends and copolymers thereof.

7. The multi-layer shrink film according to claim 1, wherein the inkjet printable layer further comprises at least one tackifying resin and/or at least one plasticizer.

8. The multi-layer shrink film according to claim 1, wherein the fillers comprise particulate fillers having a median particle size dv50 of from 0.1 to 50 μm.

9. A multi-layer shrink film comprising at least one shrink base layer and an inkjet printable layer, wherein the inkjet printable layer comprises at least 5wt.-%, based on the weight of the inkjet printable layer, of at least one cellulose-based binding agent selected from the group consisting of esters of cellulose with organic acids, cellulose ethers and mixtures thereof,
wherein the inkjet printable layer further comprises at least one tackifying resin, and/or at least one plasticizer,
wherein the at least one tackifying resin is a rosin-based tackifying resin,
wherein the rosin-based tackifying resin comprises at least one fully or partially hydrogenated rosin or an ester thereof,
wherein the at least one plasticizer is selected from the group consisting of oils, epoxidized oils, fatty acids as well as esters thereof, benzoates, glyceryl esters, esters of polycarboxylic acids with linear or branched aliphatic alcohols, (poly)glycol esters, sulfonamides, polymeric plasticizers and mixtures thereof.

10. The multi-layer shrink film according to claim 9, wherein the at least one ester of a fully or partially hydrogenated rosin is selected from the group consisting of ethyl, ethylene glycol, diethylene glycol, glyceryl, methyl, pentaerythrityl and triethylene glycol esters and mixtures thereof.

11. The multi-layer shrink film according to claim 9, wherein the at least one ester of a fully or partially hydrogenated rosin has a softening point from −50° C. to 150° C.

12. The multi-layer shrink film according to claim 9, wherein the at least one plasticizer is selected from the group consisting of epoxidized vegetable oils, oleates, caprates, tallates, glyceryl esters, (poly)glycol esters, alkyl azelates, alkyl citrates, alkyl glutarates, alkyl phthalates, alkyl trimellitates, alkyl adipates, alkyl sebacates, alkyl maleates, alkyl terephthalates, N-(n-butyl) benzene sulfonamide, polymeric plasticizers and mixtures thereof.

13. The multi-layer shrink film according to claim 9, wherein the at least one plasticizer is selected from the group consisting of polyesters of aliphatic dicarbozylic acids.

14. The multi-layer shrink film according to claim 4 comprising
one or more additional layer(s) positioned between the shrink base layer and the inkjet printable layer, and/or
a protective layer, film or foil over the outer side of the shrink base layer and/or the inkjet printable layer, and/or
one or more coating layer(s) over the outer side of the shrink base layer and/or on one or both sides of the protective layer, if present.

15. The multi-layer shrink film according to claim 14, wherein the additional layer(s) is/are selected from the group comprising additional ink receiving layers, adhesive layers, barrier layers, primer layers, seal layers, layers to adapt the color of the multilayer shrink film, layers for enhancing the mechanical and/or thermal resistance of the multilayer shrink film and combinations thereof.

16. The multi-layer shrink film according to claim 1, wherein
the shrink base layer has a thickness from 5 to 200 μm, and/or
the inkjet printable layer has a thickness from 1 to 100 μm, and/or
the multilayer shrink film has a total thickness in the range of from 30 to 300 μm.

17. The multi-layer shrink film according to claim 14, wherein the shrink base layer has a thickness from 20 to 90 μm.

18. The multi-layer shrink film according to claim 14, wherein the inkjet printable layer has a thickness from 10 to 55 μm.

19. The multilayer shrink film according to claim 1, wherein the multilayer shrink film is provided in form of a sleeve.

20. The multi-layer shrink film according to claim 1, wherein shrinking of the film is at least 5%, in machine direction (MD) and/or transverse direction (TD) immersed in water having a temperature of 95° C. for 15 sec.

21. A method of making the multilayer shrink film according to claim 1, comprising:
forming the at least one shrink base layer and the inkjet printable layer, and
incorporating the at least one shrink base layer and the ink jet printable layer into the multi-layer shrink film.

22. The method according to claim 21, wherein the shrink base layer and the inkjet printable layer are co-extruded or wherein a coating composition comprising the at least one cellulose-based binding agent is applied over the preformed shrink base layer to form the inkjet printable layer or wherein a preformed inkjet printable layer comprising the at least one cellulose-based binding agent is attached to the preformed shrink base layer, wherein attaching a preformed inkjet printable layer comprising the at least one cellulose-based binding agent to the preformed shrink base layer is preferred.

23. A method of providing graphical information by means of a multilayer shrink film according to claim 1, comprising the step(s) of (i) printing said graphical information onto the inkjet printable layer and/or (ii) attaching such a printed multilayer shrink film to an article by applying heat to said film causing it to shrink and conform to at least a part of the surface of said article.

24. An article comprising the multilayer shrink film according to claim 1.

25. The multi-layer shrink film according to claim 2, wherein the ester of cellulose with at least one organic acid is selected from the group consisting of mixed cellulose esters.

26. The multi-layer shrink film according to claim 7, wherein the at least one tackifying resin is a rosin-based tackifying resin.

27. The multi-layer shrink film according to claim 26, wherein the inkjet printable layer further comprising one or more binding agent in addition to the at least one cellulose-based binding agent.

28. The multi-layer shrink film according to claim 9, wherein the inkjet printable layer further comprising one or more binding agent in addition to the at least one cellulose-based binding agent.

29. The multi-layer shrink film according to claim 28, wherein the one or more further binding agent(s) is/are selected from the group consisting of acrylic (co)polymers, polyurethanes, polyvinyl alcohols, polyvinyl acetates, polyvinyl butyrals as well as blends, mixtures and copolymers thereof.

30. The multi-layer shrink film according to claim 14, wherein the protective layer, film or foil is positioned at least over the inkjet printable layer.

31. The multi-layer shrink film according to claim 16, wherein the shrink base layer has a thickness from 10 to 150 µm, and/or the inkjet printable layer has a thickness from 2.5 to 75 µm.

* * * * *